(12) United States Patent
Paul et al.

(10) Patent No.: US 6,323,280 B1
(45) Date of Patent: Nov. 27, 2001

(54) FLAME RETARDANT POLYCARBONATE BLENDS

(75) Inventors: Winfried G. Paul; Sivaram Krishnan; Roger J. White, all of Pittsburgh, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 08/414,702

(22) Filed: Mar. 31, 1995

Related U.S. Application Data

(63) Continuation of application No. 07/755,916, filed on Sep. 6, 1991, now abandoned, which is a continuation of application No. 07/428,561, filed on Oct. 30, 1989, now abandoned.

(51) Int. Cl.[7] .................................................. C08L 53/00
(52) U.S. Cl. ............................................................. 525/92 E
(58) Field of Search ................................. 525/92 E, 92 G

(56) References Cited

U.S. PATENT DOCUMENTS

| | | | |
|---|---|---|---|
| 3,821,326 | 6/1974 | Lauchlan et al. | 260/873 |
| 4,220,583 | 9/1980 | Mark | 260/45.7 |
| 4,252,916 | 2/1981 | Mark | 260/45.7 |
| 4,391,935 | 7/1983 | Bialous et al. | 524/82 |
| 4,600,632 * | 7/1986 | Paul et al. | 478/220 |
| 4,663,391 | 5/1987 | Boutni | 525/146 |
| 4,749,738 | 6/1988 | Boutni | 524/267 |

FOREIGN PATENT DOCUMENTS 382004  8/1990  (EP) .

* cited by examiner

Primary Examiner—Robert Dawson
(74) Attorney, Agent, or Firm—Joesph C. Gil; Aron Preis

(57) ABSTRACT

The present invention resides in the surprising properties found to characterize the thermoplastic molding composition which comprise a polydiorganosiloxane block copolycarbonate and an additive amount of a partially fluorinated polyolefin. The composition of the invention has a surprisingly improved flame retardance and a high impact strength.

4 Claims, No Drawings

FLAME RETARDANT POLYCARBONATE BLENDS

This application is a continuation, of application Ser. No. 07/755,916 filed Sep. 6, 1991, now abandoned, which was a Continuation of Ser. No. 07/428,561 filed Oct. 30, 1989.

FIELD OF THE INVENTION

The present invention relates to thermoplastic molding compositions and more particularly to compositions containing a polydiorganosiloxane block copolycarbonate.

SUMMARY OF THE INVENTION

The present invention resides in the surprising properties found to characterize the thermoplastic molding composition which comprise a polydiorganosiloxane block copolycarbonate and an additive amount of a partially fluorinated polyolefin. The composition of the invention shows a surprising combination of improved flame retardance and high impact strength.

BACKGROUND OF THE INVENTION

Articles molded from polycarbonate resins are well known and are widely used in a variety of applications. Among their attractive properties, mention is often made of their impact strength and thermal stability. These and other properties make polycarbonate resins ideal material for the preparation of business machines.

The art is noted to include U.S. Pat. Nos. 4,252,916 and 4,663,391 which disclosed polycarbonate based compositions containing a partially fluorinated polyolefin. The compositions are respectively said to have improved thermal stability and improved wear resistance.

Translucent, flame-retardant polycarbonate compositions containing a salt and a partially fluorinated polyolefin have been disclosed in U.S. Pat. No. 4,220,583. Also noted in this connection is the composition disclosed in U.S. Pat. No. 4,749,738. Said to feature improved wear resistance, the composition contains a polycarbonate resin, a polyolefin, a fluorinated polyolefin and a silicone fluid.

It is an object of the present invention to provide a thermoplastic molding composition which is characterized by its improved flame retardance and impact performance.

DETAILED DESCRIPTION OF THE INVENTION

The composition of the invention comprise (i) polydiorganosiloxane block copolycarbonate and (ii) an additive amount of at least one partially fluorinated polyolefin.

The copolycarbonate suitable in the present context conforms structurally to

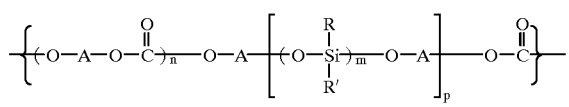

wherein n is an integer of from 1 to 1000, m is an integer of from 1 to about 500, p is an integer of about 1 to 10, A is a derivative of an aromatic dihydroxy compound and R and R' are independently a $C_1$–$C_{20}$ alkyl or a $C_6$–$C_{14}$ aryl radical, both the aryl and alkyl radicals may be substituted by halogen atoms. Most preferred R and R' radicals are selected from the group which consists of methyl, ethyl, propyl, n-and tert.-butyl, chloromethyl, trifluoropropyl, phenyl, chlorophenyl and naphthyl. The block copolycarbonate of the invention comprise about 40 to 99.5, preferably 85 to 99 percent by weight of polycarbonate segments, the complimentary segments being polydiorganosiloxanes.

The suitable block copolycarbonate resins are further characterized in that their relative viscosity, measured on a solution of 0.5 gm in 100 ml of dichloromethane at 25° C., is at least 1.15, preferably from about 1.18 to about 1.38. Most preferably the polydiorganosiloxane segments which characterize the block copolycarbonates of the invention contain an average of about 5 to 200, most preferably 7 to 160 silicon atoms per segment. A segment in the present context is a term used to describe a siloxane chain which is not interrupted by a carbon atom.

The derivatives of the aromatic dihydroxy compounds, —A—, include

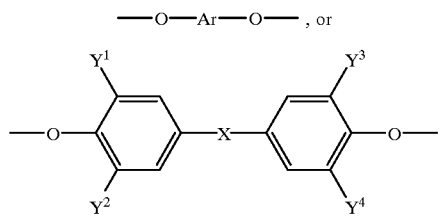

wherein Ar is a saturated six membered hydrocarbon ring and where

X denotes a single bond,

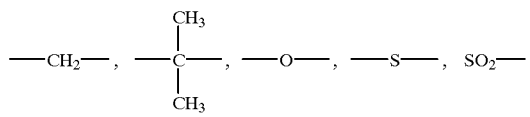

and

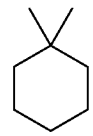

including substituted cycloalkylidene, or

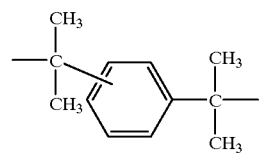

$Y^1$ through $Y^4$ independently denote a hydrogen atom, $C_1$–$C_4$ alkyl or a halogen atom.

Preferably —A— is derived from 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dimethyl-4-hydroxyphenyl)-propane, bis-(3,5-dimethyl-4-hydroxyphenyl)-ethane, bis-(3,5-dimethyl-4-hydroxyphenyl)-methane or bis-(4-hydroxyphenyl)sulphide.

The copolymer may include branching agents and/or chain stoppers both of which are known in the art. Preferred branching agents are compounds having a functionality of at least three and are described in DE-OS (German Published Specifications) 1,570,533 and 1,595,762 and in U.S. Pat. No. 3,544,514 incorporated herein by reference. These include trihydric phenols, aromatic tricarboxylic acids and hydroxycarboxylic acids having at least three functional groups. Examples of the preferred branching agents are 2,4-bis-(4-hydroxyphenyl-isopropyl)-phenol, 2,6-bis-(2-hydroxy-5-methylbenzyl)-4-methylphenol, 2-(4-hydroxyphenyl)-2-(2,4-dihydroxyphenyl)propane, 1,4-bis-(4,4-dihydroxytriphenylmethyl)benzene, 2,4-dihydroxybenzoic acid, trimesic acid, cyanuryl chloride, 3,3-bis-(4-hydroxyphenyl)-2-oxo-2,3-dihydroindole and 3,3-bis-(4-hydroxy-3-methyl-phenyl)-2-oxo-2,3-dihydroindole.

The amount of branching agent is generally about 0.05 to about 2 mole percent relative to the molar amount of the dihydroxy components.

The chain stoppers suitable in the present context include radicals of phenol, benzoic acid, mono- and dialkyl-phenols and mono- and dialkylbenzoic acids where the alkyl substituents contain up to 20 carbon atoms per terminal group. The preferred terminal groups conform structurally to

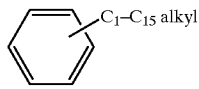

Examples of preferred chain stoppers are the radicals of phenols, p-tert.-butyl-phenol, p-tert.-octyl-phenol, p-nonyl-phenol, 3,5-di-tert.-butyl-phenol, 2-(3,5-dimethylheptyl)-phenol and 4-(3,5-dimethylheptyl)-phenol. In place of free phenols, their halocarbonates may be employed, and in place of the carboxylic acids, their acid chlorides may be employed. The amount of the terminal groups is generally about 1 to 10 mole percent relative to the molar amount of the dihydroxy compounds.

The preparation of the block copolycarbonates of the invention may be carried out by conventional procedures such as by the two phase interfacial process, from α,ω-bis-(hydroxyaryloxy)-polydiorganosiloxane, bisphenols, carbonic acid derivatives, such as phosgene, optionally with chain terminators and/or branching agents. Also suitable for the preparation of the block copolycarbonates are the well known transesterification process and the process in a homogeneous solution. Suitable block copolycarbonates are available in commerce such as under the trademark Makrolon, from Mobay Corporation.

Further description of block copolycarbonates suitable in the present invention may be found in U.S. Pat. Nos. 3,189,662, 3,419,634, 3,821,325 and 4,584,360, the disclosure of which all is incorporated by reference herein.

The partially fluorinated polyolefin of the present invention (hereinafter pf polyolefin) are well known compounds which are also commercially available, for instance under the trademark Kynar, from Pennwalt Corporation. Alternatively, these compounds may be readily prepared by known procedures. Among the suitable compounds are poly(vinylidene fluoride), poly(vinylfluoride), poly(trifluoroethylene), poly(vinylidene difluoride), poly(chlorotrifluoroethylene) and poly(trifluoroethylene alkali metal sulfonate). The pf polyolefin may advantageously be homopolymers, copolymers or terpolymers which contain a major portion of vinylidene fluoride with at least one copolymerizable monomer selected from the group consisting essentially of hexafluoropropylene, trifluoroethylene, chlorotrifluoroethylene and tetrafluoroethylene and mixtures of the homopolymer, copolymer and terpolymer. Preferably, the pf polyolefin contains at least 70 mole percent of polyvinylidene fluoride monomer units. Methods for the preparation of suitable compounds have been described in the literature including in Billmeyer, F. W., Jr., Textbook of Polymer Science, Interscience Publishers, New York, N.Y., 1966, pp. 425–427; Monermoso, J. C., Rubber Chem. Tech., 34, 1521 (1961) and Rudner, M. A., Fluorocarbons, Reinhold Publishing Corporation, New York, N.Y., all of which documents are incorporated by reference herein. The pf polyolefins conform structurally to

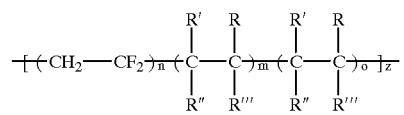

wherein R, R', R" and R'" independently denote fluorine, hydrogen, chlorine or $CF_3$, n is an integer of from 1 to 100, m and o independently are integers of from 0 to 100 preferably 0 to 20 and z is an integer of from 3 to 15,000 such that the number average molecular weight of the compound is greater than 20,000, preferably 30,000 to 1,000,000, as determined by gel permeation chromatography.

In accordance with the invention, thermoplastic molding compositions having improved impact strength and flame retardance are prepared by blending a block copolycarbonate and a pf polyolefin in an amount sufficient to improve the flame retardance of the block copolycarbonate. Preferably, the amount of added pf polyolefin is about 1 to about 30, more preferably about 2 to 10 percent relative to the weight of the composition. The preparation of the composition of the invention is carried out using conventional means and following conventional procedures for the preparation of homogeneous blends and molding compositions known in the thermoplastic art.

Customary additives may be added to the composition of the invention for their art recognized functions. These include dye stuff, pigments, hydrolysis stabilizers, thermal stabilizers and UV stabilizers. Fillers, reinforcing agents, flame retardants and mold release agents may also be incorporated in the composition. The composition of the invention may be used in all applications where conventional polycarbonate based compositions have been used and where in addition there is an advantage needed in terms of improved flame retardance with no loss in impact strength.

The following examples which include a demonstration of the invention should not be considered as in any way limiting the scope of the invention.

In the following examples, the homopolycarbonate resin which was used for the purpose of comparison was Makrolon which has a relative solution viscosity of 1.255. The block copolycarbonate was characterized in that its siloxane content was about 5% and that it had about 80 silicon atoms per segment. Its relative viscosity was 1.265. The partially fluorinated polyolefin was polyvinylidene difluoride. The table below summarizes the results of the comparisons between the composition of the invention and other compositions which are not of the invention.

| Example | A | B | C | D | E | F |
|---|---|---|---|---|---|---|
| Homopolycarbonate, % | 100 | — | 97.5 | 50.0 | — | 95.0 |
| Block copolycarbonate, % | — | 100 | — | 50.0 | 95.0 | — |
| Pf-polyolefin, % | — | — | 2.5 | — | 5.0 | 5.0 |
| Impact Strength Izod, Notched, J/m | | | | | | |
| @ ⅛" | 753 | 802 | 666 | 796 | 764 | 605 |
| @ ¼" | 108 | 667 | 128 | 690 | 606 | 318 |
| Flame retardance, per UL 94 ⅛" | V-2 | V-1 | V-2 | fail | V-0 | fail |

As is clear from the above results, the flame retardance of the block copolymer of the invention, V-1 is improved upon the incorporation of the pf polyolefin of the invention therewith. The flame retardance of the composition is V-0, a performance which could not have been predicted based on the prior art. The prior art composition, represented by Examples C and F demonstrate that the addition of a pf polyolefin to a homopolycarbonate does not bring about an improvement in the flame retardance of the resin. While the homopolycarbonate has a V-2 rating, the prior art composition fails the UL-94 test (Example F) or in the case of Example C, does not improve the rating at all. The results above also demonstrate that the impact performance of the composition of the invention, Example E, has a level of impact strength which is higher than the corresponding prior art composition—Example F. The substantial retention of the impact strength of the composition of the invention as compared to the impact strength of the unmodified block copolycarbonate, compare Examples E and B, is an unexpected advantage in view of the significant deterioration in strength which characterize the prior art compositions—Examples C and F—in comparison to the strength of the unmodified homopolycarbonate, Example A.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition consisting essentially of a homogeneous blend of
   (i) a block copolycarbonate conforming structurally to

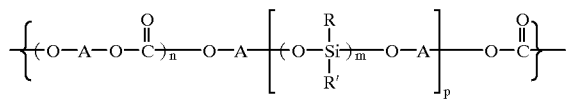

wherein n is an integer of 1 to 1000, m is an integer of about 1 to 500, p is an integer of about 1 to 10, A is a derivative of an aromatic dihydroxy compound, R and R' are $C_1$–$C_{20}$ alkyl or $C_6$–$C_{14}$ aryl radical and
   (ii) about 2 to 10 percent relative to the weight of said blend, of a partially fluorinated polyolefin having a number average molecular weight of 30,000 to 1,000,000 as determined by gel permeation chromato-graphy selected from the group consisting of poly(vinylidene fluoride), polyvinylidene difluoride, poly(vinylfluoride), poly(trifluoroethylene), poly(chlorotrifluoroethylene) and poly(trifluoroethylene alkali metal sulfonate), said composition having a flame retardance rating of V-0 in accordance with UL-94 @ ⅛", said rating being achieved in the absence of additional flame retarding agents.

2. The thermoplastic molding composition of claim 1 wherein said (ii) is present in an amount of 5 percent relative to the weight of said blend.

3. The composition of claim 1 wherein said partially fluorinated polyolefin is polyvinylidene difluoride.

4. A thermoplastic molding composition consisting essentially of a homogeneous blend of
   (i) a block copolycarbonate conforming structurally to

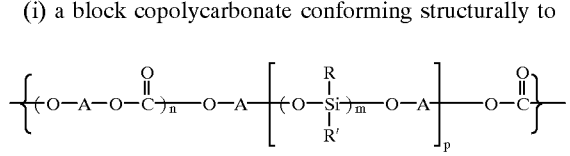

wherein n is an integer of 1 to 1000, m is an integer of about 1 to 500, p is an integer of about 1 to 10, A is a derivative of an aromatic dihydroxy compound, R and R' are $C_1$–$C_{20}$ alkyl or $C_6$–$C_{14}$ aryl radical and
   (ii) an amount of 5 percent, relative to the weight of said blend, of polyvinylidene difluoride having a number average molecular weight of 30,000 to 1,000,000 as determined by gel permeation chromatography, said composition having a flame retardance rating of V-0 in accordance with UL-94 @ ⅛", said rating being achieved in the absence of additional flame retarding agents.

* * * * *